Patented Nov. 17, 1936

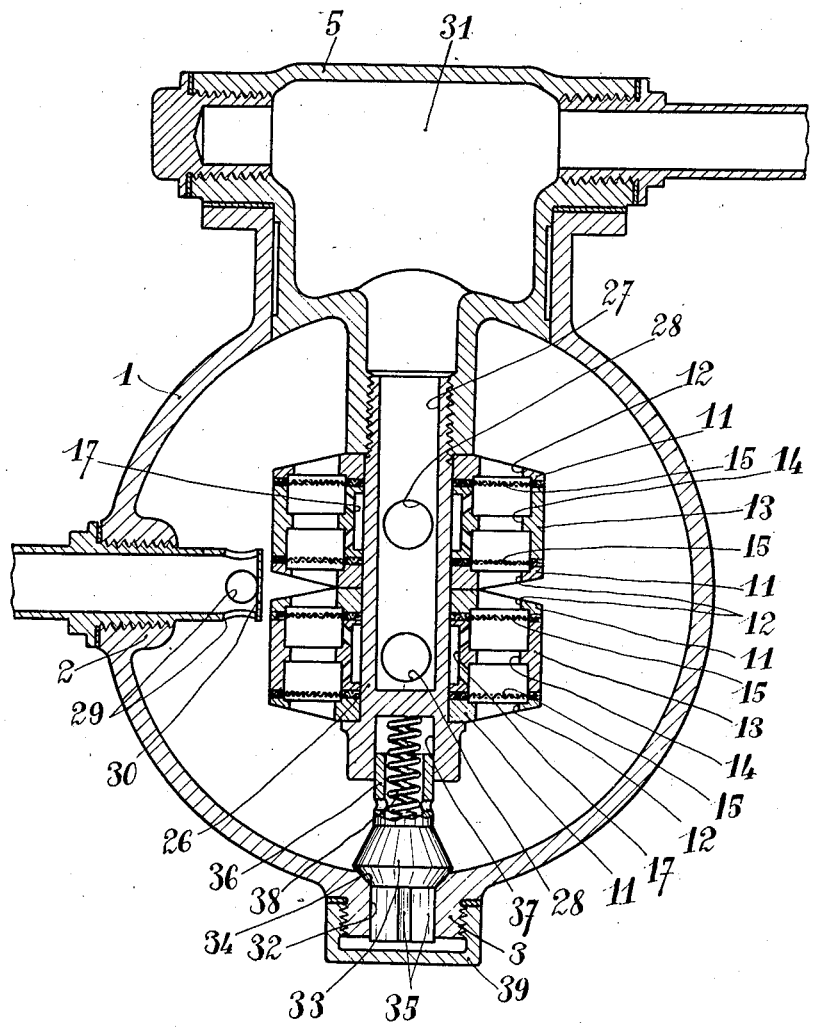

2,061,343

UNITED STATES PATENT OFFICE 2,061,343

LIQUID PURIFIER

Charles Henri Bichler, Paris, and Georges Eyssartier, Arcachon, France

Application May 26, 1934, Serial No. 727,696
In France June 2, 1933

2 Claims. (Cl. 210—178)

This invention relates to liquid purifiers, and is more particularly applicable to purifiers for fuel intended to be used for feeding internal combustion engines.

A particular object of the invention is to provide purifiers having a very large filtering surface relatively to their volume; therefore, these purifiers cannot easily become clogged and, consequently, they are satisfactory in operation.

The invention is characterized by the fact that the said purifiers are constituted by a vessel in which opens the conduit supplying the liquid to be purified, by filtering chambers having at least one face provided with a filtering surface, grouped in parallel and arranged within the said vessel, and by a support for the said filtering chambers, which communicates with the interior of the same and serves for the evacuation of the purified liquid.

The invention is clearly illustrated in the accompanying drawing in which is illustrated an axial vertical sectional view of a form of purifier for an airplane engine.

The purifier illustrated in the drawing comprises a container 1 of spherical shape, at the center of which filtering chambers are arranged. The latter are two in number and their bowls 11 as well as their plates 13 are fitted on a bolt 26, screwed in a screw-threaded hole provided for that purpose in the cap 5 and which thus holds them rigidly. The bolt 26 is axially perforated with a channel 27 allowing the discharge of the purified liquid which is admitted therein through openings 28, through which open channels putting the groove 17 in communication with the channel 27.

The piping supplying the liquid to be purified and which is screwed in the boss 2, extends within the container 1 and opens in the latter only through laterally arranged openings 29, a wall or partition 30 closing the end of this piping and constituting a deflector.

The cap 5, which is hollow, is internally provided with a chamber 31 in which circulates the liquid to be purified; this chamber 31 acts as a feeder and allows to feed the engine even if the fuel supply is momentarily interrupted.

The container 1 is also perforated, at a place diametrally opposite the cap 5, with a hole 32, for the discharge of the impurities, but the said hole 32 is obturated by a valve 33 which engages with a seat 34 provided for that purpose. This valve 33 is guided in the hole 32 by blades 35, and it is also provided with a tubular extension 36 sliding in a hole 37 formed at the end of the bolt 26. A spring 38, arranged in the extension 36, acts on the valve 33 for constantly pressing it against its seat 34.

A blind nut 39 is screwed on the screw-threaded portion of the boss 3 and prevents any leakage of liquid which might occur between the valve 33 and its seat 34.

When impurities have accumulated at the lower part of the container 1, the nut 39 can be unscrewed without any loss of liquid, and the valve 33 can be lifted by acting on the same in opposition to the action of the spring 38, by means of a finger or of any tool, such as a metal rod or a screw-driver, until all the impurities have been evacuated; at this moment, it suffices to allow the valve 33 to fall back upon its seat 34, this stopping the flow of liquid, and to screw back again the nut 39 constituting a plug.

The liquid purifier described above has the important advantage of presenting a very large total filtering surface for a small volume, and always has elementary filtering surfaces through which the liquid to be purified passes upwardly and, consequently, on which the impurities cannot settle.

This purifier also offers this advantage that the filtering chambers cannot become clogged by the impurities, as the latter settle at the lower part of the container in which the liquid to be purified is admitted. The purifier has also for additional advantage that its position can be changed whilst its operation remains quite satisfactory, and this owing to the fact that the impurities roll against the walls of the spherical container and do not reach the filtering chambers.

What we claim as our invention and desire to secure by Letters Patent is:—

1. Liquid purifier comprising in combination a spherical container in which the liquid to be purified is admitted and where the impurities settle, with a discharge orifice for these latter, provided with an obturating means, a hollow cap having an inner chamber from which the purified liquid is discharged and fitted on the said container, a tubular bolt supported by the said cap and extending downwardly into the said container, annular bowls, each pair of which clamp an annular plate between them, the said bowls and the said plates being mounted on the said tubular bolt, wire gauze crowns interposed between the edges of each of the said plates and the edges of the said bowls arranged on either side of the latter, channels provided in the said plates and the tubular bolt for causing the space comprised between the wire gauze crowns to communicate with the interior of the said tubular bolt, a valve which is subjected to the action of a spring and controls the said orifice for evacuating impurities from the said container, blades integral with the said valve and sliding in the said orifice for evacuating impurities, a tubular extension also integral with the said valve and sliding in a recess of the said tubular bolt, and a spring arranged in the said tubular extension for constantly pressing the said valve against the said orifice.

2. Liquid purifier as claimed in claim 1, in which the blades for guiding the valve controlling the orifice for evacuating impurities from the container are projected slightly to the exterior so as to act easily on the said valve when the means for obturating the said orifice is removed.

CHARLES HENRI BICHLER.
GEORGES EYSSARTIER.